United States Patent
Tu et al.

(10) Patent No.: US 7,952,238 B2
(45) Date of Patent: May 31, 2011

(54) LINEAR ELECTRIC GENERATOR HAVING AN IMPROVED MAGNET AND COIL STRUCTURE, AND METHOD OF MANUFACTURE

(75) Inventors: Yu-Ta Tu, Hsinchu Hsien (TW); Show-Jong Yeh, Hemet, CA (US)

(73) Assignee: Sunyen Co., Ltd., Taipei (TW)

( * ) Notice: Subject to any disclaimer, the term of this patent is extended or adjusted under 35 U.S.C. 154(b) by 107 days.

(21) Appl. No.: 12/382,431

(22) Filed: Mar. 17, 2009

(65) Prior Publication Data

US 2010/0289347 A1 Nov. 18, 2010

Related U.S. Application Data

(60) Division of application No. 11/898,953, filed on Sep. 18, 2007, now Pat. No. 7,573,163, and a continuation of application No. 11/142,268, filed on Jun. 2, 2005, now Pat. No. 7,309,934, and a continuation of application No. 10/410,160, filed on Apr. 10, 2003, now Pat. No. 6,936,937, and a continuation-in-part of application No. 10/170,715, filed on Jun. 14, 2002, now abandoned.

(51) Int. Cl.
*H02K 35/02* (2006.01)
(52) U.S. Cl. .................... 310/12.24; 310/12.12
(58) Field of Classification Search .......... 310/12.01, 310/12.12, 12.13, 12.24
See application file for complete search history.

(56) References Cited

U.S. PATENT DOCUMENTS

| | | | |
|---|---|---|---|
| 3,976,923 A | 8/1976 | Firtion et al. | |
| 4,387,935 A * | 6/1983 | Studer | 310/90.5 |
| 4,500,827 A | 2/1985 | Merritt et al. | |
| 4,709,176 A | 11/1987 | Ridley | |
| 4,924,123 A * | 5/1990 | Hamajima et al. | 310/15 |
| 5,347,186 A | 9/1994 | Konotchick | |
| 5,363,445 A | 11/1994 | Shyu | |
| 5,578,877 A | 11/1996 | Tiemann | |
| 5,818,132 A * | 10/1998 | Konotchick | 310/17 |
| 5,952,743 A | 9/1999 | Sidey | |
| 5,975,714 A | 11/1999 | Vetorino et al. | |
| 6,002,184 A | 12/1999 | Delson et al. | |
| 6,147,422 A | 11/2000 | Delson et al. | |
| 6,220,719 B1 | 4/2001 | Veterino et al. | |
| 6,229,429 B1 | 5/2001 | Horon | |
| 6,236,124 B1 | 5/2001 | Sekiyama et al. | |
| 6,242,827 B1 | 6/2001 | Wolf et al. | |
| 6,307,285 B1 | 10/2001 | Delson et al. | |
| 6,313,552 B1 | 11/2001 | Boast | |
| 6,346,791 B1 | 2/2002 | Barguirdijian | |
| 6,768,230 B2 | 7/2004 | Cheung et al. | |
| 2003/0034697 A1 | 2/2003 | Goldner et al. | |

* cited by examiner

*Primary Examiner* — Dang D Le
(74) *Attorney, Agent, or Firm* — Bacon & Thomas, PLLC

(57) ABSTRACT

Linear electric generators include stationary windings and armature magnets arranged to reciprocate axially relative to the windings, or stationary magnet structures and movable windings arranged to reciprocate relative to the stationary magnet structures. The armature magnets or stationary magnet structures are in the form of multiple pole magnets made up of a plurality of individual pole structures, each pole structure including a pair of magnets joined to each other with facing poles of like polarity. In addition, the windings may be in the form of a double winding structure including at least one first clockwise winding and at least one second counter-clockwise winding arranged in a multi-layered stacked arrangement.

3 Claims, 9 Drawing Sheets

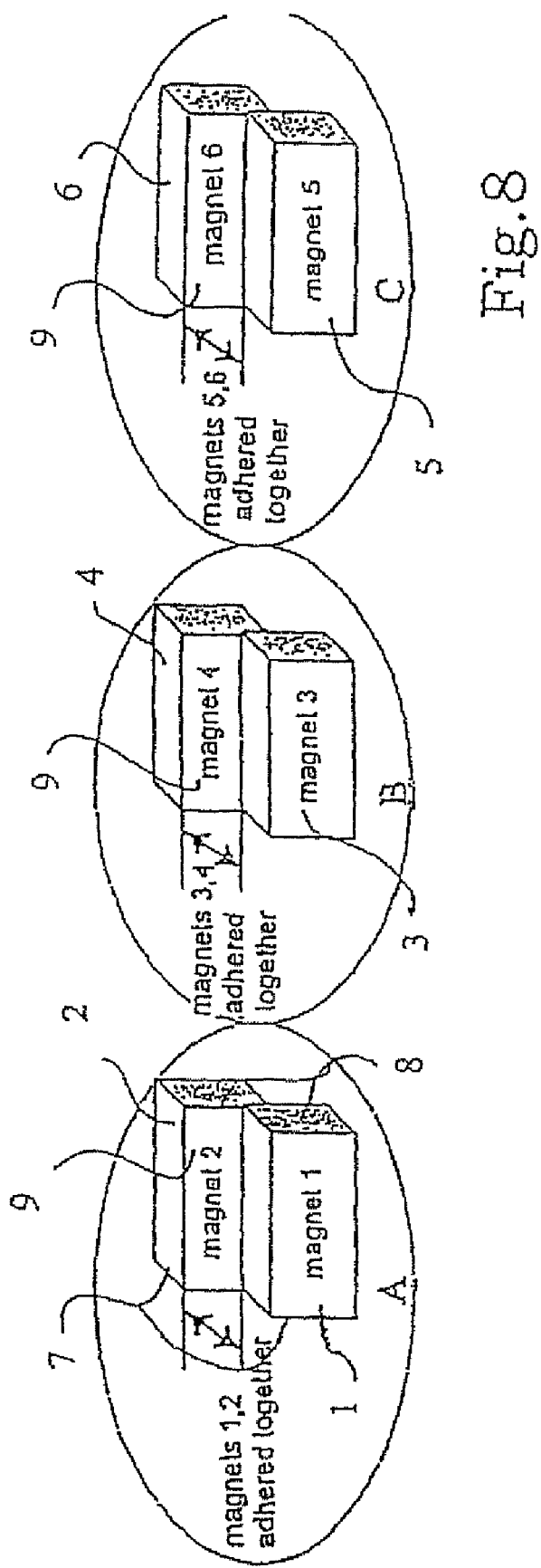

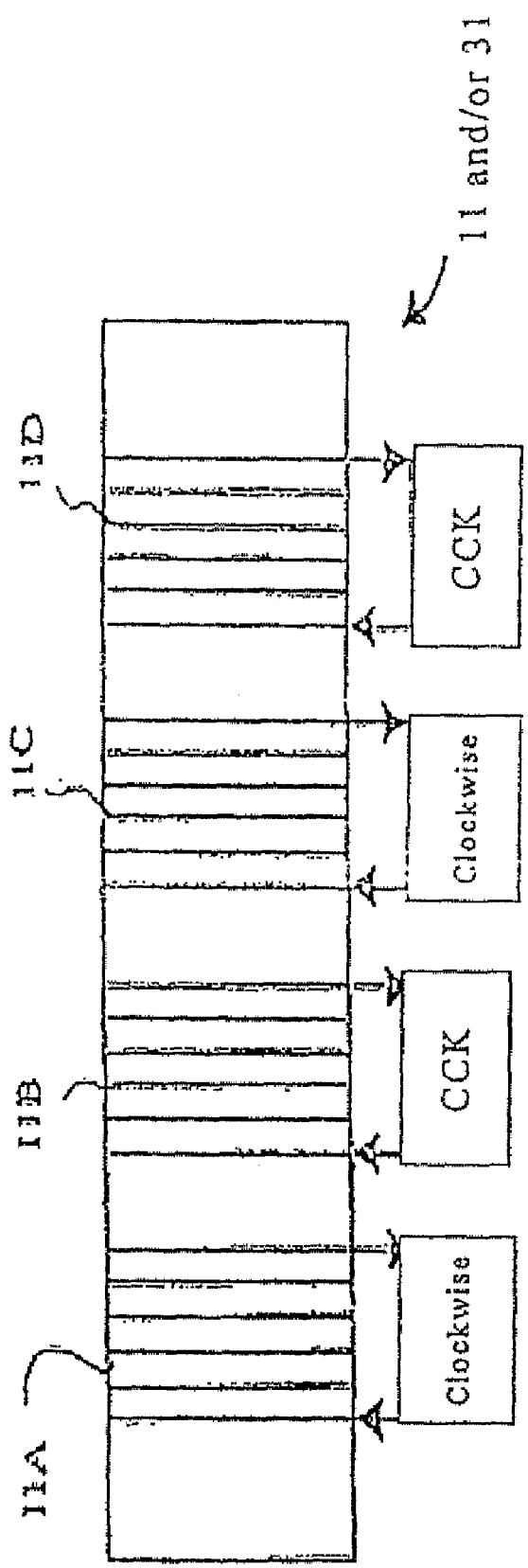

LINEAR ELECTRIC GENERATOR HAVING AN IMPROVED MAGNET AND COIL STRUCTURE, AND METHOD OF MANUFACTURE

This application is a division of nonprovisional application Ser. No. 11/898,953, filed Sep. 18, 2007, which is a continuation of U.S. patent application Ser. No. 10/410,160, filed Apr. 10, 2003, which is a continuation-in-part of U.S. patent application Ser. No. 10/170,715, filed Jun. 14, 2002.

BACKGROUND OF THE INVENTION

1. Field of the Invention

This invention relates to a linear electric generator of the type disclosed in parent U.S. patent application Ser. No. 10/170,715, and more particularly to a linear electric generator that includes one or both of the following:

Armature magnets or multiple pole stationary magnet structures having a series of N-S alternating poles and constructed using a novel joining method that overcomes problems of high remanance and coercivity, and thereby increases flux density;

Stationary or movable windings constructed using a novel winding method that results in maximum magnetic line cutting during linear motion.

2. Description of Related Art

In a linear electric generator, the magnetic elements and windings are in linearly reciprocal motion relative to each other. This linear reciprocal motion causes a diamagnetic effect that resists the motion of the magnetic elements within the windings, reducing the electromotive force.

Typically, the moving part of the generator is an armature consisting of a single magnet arranged to move linearly through a coil. To counter the losses caused by the diamagnetic effect, it was proposed in copending U.S. patent application Ser. No. 10/170,715, filed Jun. 14, 2002, to use multiple windings and magnetic elements, and to add accelerating elements to the generator. The accelerating elements may be in the form of resilient elements, such as rubber plugs or metal springs situated at the ends of travel of the moving magnets to impart a mechanical rebounding force as the magnets engage the resilient elements and reverse direction, in the form of a magnetic material or system that generates a repulsive force as the moving magnets approach the end of their travel, or in the form of a combination of mechanical and magnetic elements.

Such linear generators are compact and efficient, and can be used to convert motion of the generator into a source of recharging power for a variety of electronic devices, such as cellular telephones (which are the subject of copending U.S. patent application Ser. No. 10/170,717), personal CD players, handheld electronic game players, and the like. This eliminates the need to obtain charging power from the electrical power grid, saving energy and reducing pollution associated with electricity generation, and also promotes the use of rechargeable batteries, reducing environment hazards associated with disposable non-rechargeable batteries.

A limitation on the commercial development of such power sources has been the relatively low magnetic efficiency of suitable sized and priced magnets and coils, which typically have a relatively low flux density and/or provide an inefficient distribution of magnetic lines. Although more efficient magnets or magnet/coil structures are known, such as the rare earth magnets disclosed in U.S. Pat. Nos. 5,347,186 and 5,818,132; the composite armature and multiple coil structure of U.S. Pat. No. 4,500,827; the wound magnetic core disclosed in U.S. Pat. No. 4,709,176; or the composite coil and stack neodymium disc magnets disclosed in U.S. Pat. No. 5,975,714, the previously proposed magnet and/or coil structures are generally expensive to manufacture and/or too large for the applications mentioned above. Further, while distribution of magnetic lines from a coil can be improved by adding a permeable material to the coil structure, the permeable material has the disadvantage not only of adding to the complexity of the structure, but also to the diamagnetic resistance effect.

SUMMARY OF THE INVENTION

It is accordingly a first objective of the invention to provide a linear electric generator that can be easily manufactured and yet that is compact and efficient enough to be used as a recharging power source in electronic devices such as cellular telephones, portable CD players, and handheld electronic games, thereby reducing demands on the electrical power grid with consequent reductions in energy consumption and pollution, and increasing the demand for rechargeable batteries with consequent reductions in solid waste.

It is a second objective of the invention to provide an armature for a linear electric generator having increased flux density.

It is a third objective of the invention to provide a winding arrangement for a linear electric generator having increased magnetic lines and an improved distribution of the magnetic lines to optimize interaction with the armature, and which does not require a permeable magnetic material.

It is a fourth objective of the invention to provide a method of manufacturing a linear electric generator having increased efficiency, low cost, and small size.

These objectives are achieved, in accordance with the principles of a first preferred embodiment of the invention, by a linear electric generator made up of plurality of axially aligned windings and a multiple pole armature arranged to reciprocate linearly within the windings, and which further includes accelerating elements that may be in the form of:

resilient elements, such as rubber plugs or metal springs, situated at the ends of travel of the moving magnets to impart a mechanical rebounding force as the magnets engage the resilient elements and reverse direction, a magnetic material or system that generates a repulsive force as the moving magnets approach the end of their travel, or a combination of mechanical and magnetic elements.

According to the principles of the first preferred embodiment of the invention, the multiple pole armature is made up of a plurality of individual magnets, each including a north pole and a south pole, arranged in series.

The objectives of the invention are also achieved, in accordance with the principles of a second preferred embodiment of the invention by a linear electric generator made up of a plurality of axially aligned windings surrounding and arranged to reciprocate linearly relative to a stationary multiple pole magnet structure. The multiple pole magnet structure preferably includes a single multiple pole magnet positioned within the axially aligned windings, and may further include parallel magnet structures positioned outside the windings, or coaxial magnet structure positioned both inside and outside the axially-aligned windings.

In each of the preferred embodiments of the invention, the armature or stationary multiple pole magnet structures may be constructed of pairs of magnets joined by an adhesive, sintering, welding, soldering, bonding, or similar material or technique, or by any combination of two or more such joining methods, applied to a planar surface of at least one of the magnets such that like poles of the two magnets in the pair face each other to form pole structures. Pole structures of N-S alternate polarity are then joined at ends of the respective magnets to form a rectangular parallelepiped shaped multiple pole magnet. The flux density within such a magnet structure has been found to be substantially higher than that of a corresponding conventional four pole magnet structure.

In addition, in each of the preferred embodiment of the invention, the winding may consist of a core-less or air core double winding structure in which the coil includes at least one first clockwise winding and at least one second counter-clockwise winding in a multi-layered stacked arrangement that maximizes passage of the magnetic lines through the armature and/or stationary multiple pole magnet structure and facilitates the distribution of the lines to maximize interaction with flux in the armature and thereby generate maximum energy.

BRIEF DESCRIPTION OF THE DRAWINGS

FIG. 8 is a schematic diagram illustrating the construction of a multiple pole armature magnet or stator structure for use in the linear electric generators of FIGS. 1-7.

FIG. 10 is a schematic diagram of a multiple winding arrangement suitable for use in the linear electric generator of FIG. 1.

DETAILED DESCRIPTION OF THE PREFERRED EMBODIMENTS

Figure 1:
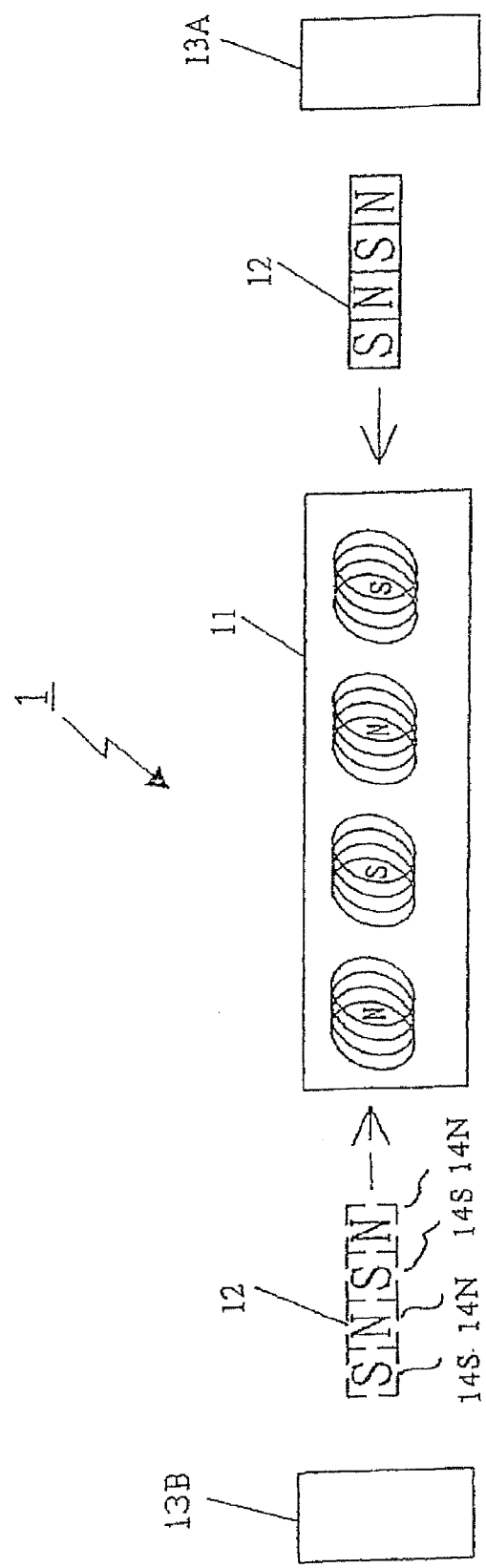
FIG. 1 is a schematic diagram of a linear electric generator constructed in accordance with the principles of a first preferred embodiment of the invention, including a stationary coil and a movable multiple pole magnetic armature magnet with a series of N-S-N-S alternating arrangement.
Figure 2:
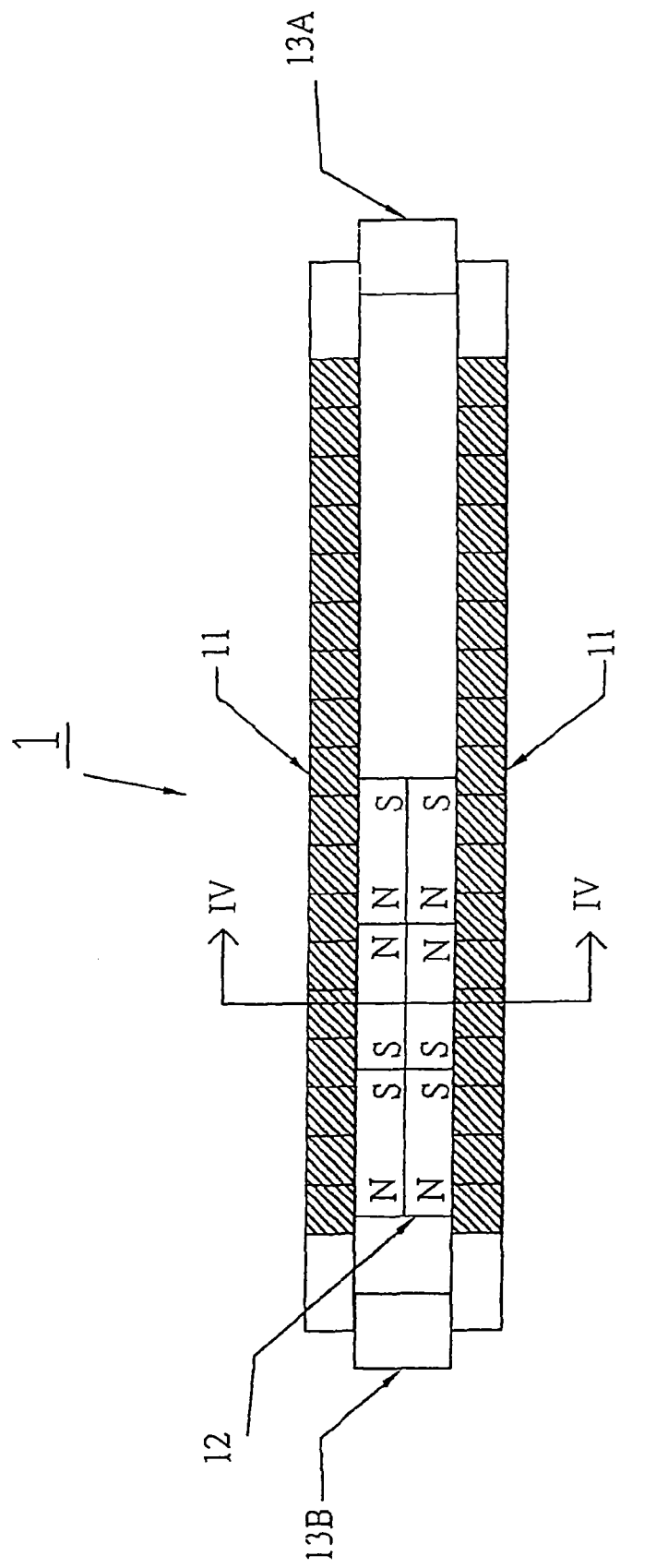
FIG. 2 is a schematic diagram of a linear electric generator according to a second preferred embodiment, including a stationary coil and a movable multiple pole magnetic armature magnet with a series of N-S-S-N alternating arrangement.
Figure 2A:
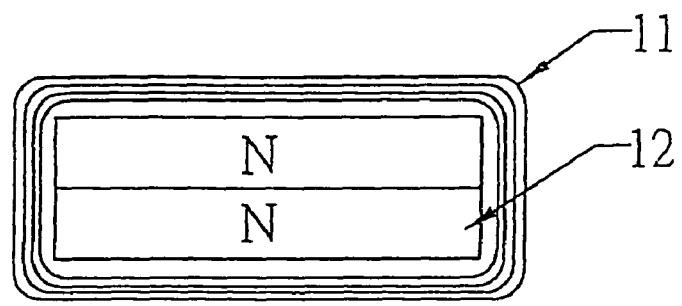
FIGS. 2A and 2B are cross section views of FIG. 2, taken along line IV-IV of FIG. 2.
Figure 2B:
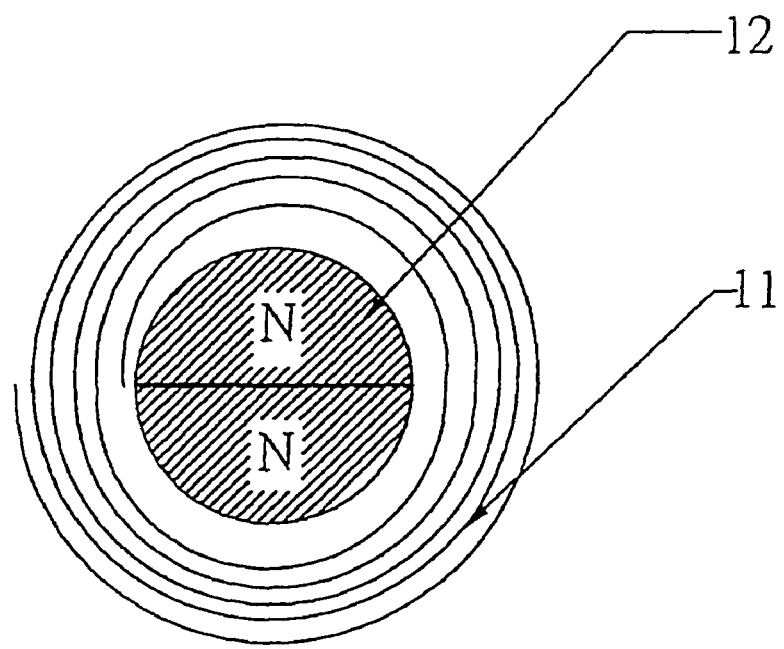
Figure 9A:
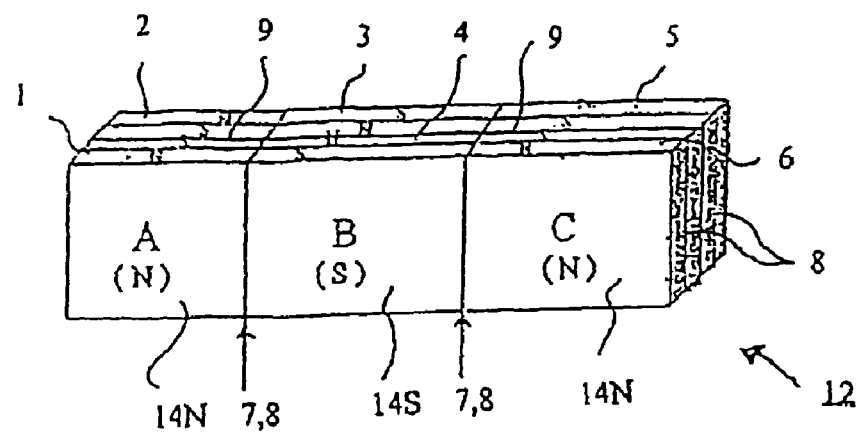
FIGS. 9A and 9B are schematic diagrams of a multiple pole armature magnet or stator structure constructed using the method illustrated in FIG. 8.
Figure 9B:
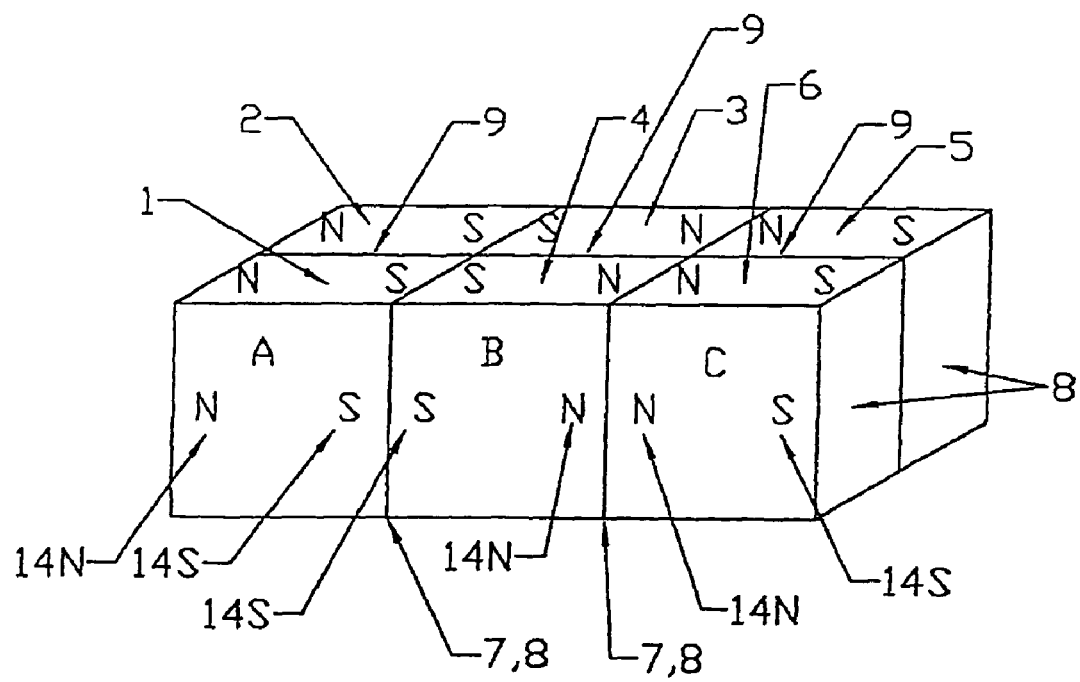

Referring to FIGS. 1 and 2, a linear electric generator 1 includes a plurality of stationary coil windings 11 and movably multiple pole armatures 12, each made up of serially connected dipole magnets and/or N-S alternating single pole structures 14S and 14N. FIGS. 2A and 2B show cross section views taken along line IV-IV of FIG. 2. The serially connected dipole magnets may optionally be constructed of pairs of dipole magnets, as illustrated in FIGS. 8, 9A and 9B and described below. However, the invention is not limited to multiple pairs of dipole magnets. Instead, the invention may be implemented by a single pair of pole structures.

In order to overcome the drag caused by interaction between the magnetic field of the armature 12 and windings 11, the linear electric generator 1 of the two preferred embodiments as shown in FIGS. 1 and 2 includes accelerating elements 13A and 13B at each end of the windings, in the path of the respective armatures 12 as shown in FIGS. 1 and 2. The accelerating elements 13A, 13B may be made of a resilient material such as rubber, springs, or a combination thereof, a magnetic material or system which will generate a repulsive force against the armatures 12, or a combination of resilient and magnetic elements. The accelerating elements may also be part of a machine, device, or system for generating the rebounding or repulsive force. Moreover, the windings 11 of this first embodiment may be movable and the armatures 12 may be stationary, with the accelerating elements being arranged for the windings 11 and generate a repulsive force against the windings rather than the armatures.

Figure 3:
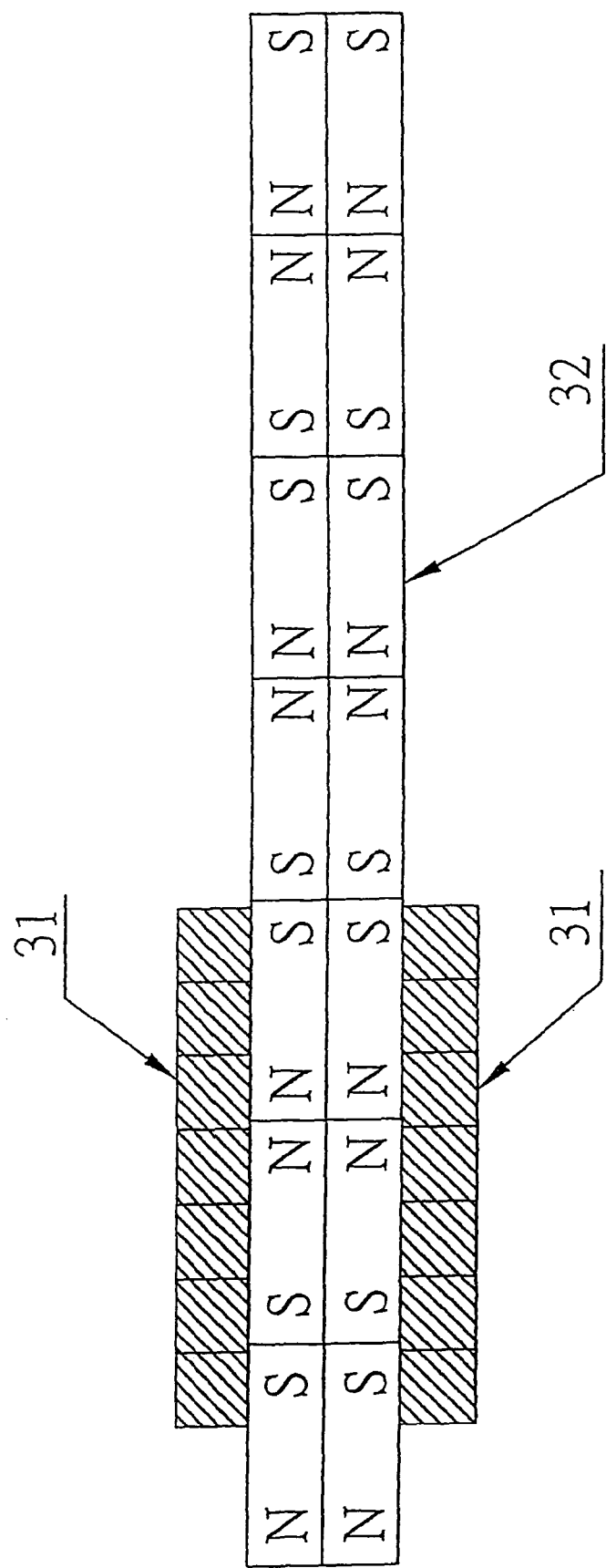
FIG. 3 is a schematic diagram of a specific implementation of the linear electric generator constructed in accordance with the principles of the second preferred embodiment of the invention, including a movable coil and a stationary multiple pole magnetic stator structure with a series of N-S-S-N alternating arrangement.

Alternatively, in accordance with the principles of a second preferred embodiment of the invention, the stationary coil and movable armature magnets of FIGS. 1 and 2 may be replaced by a stationary multiple pole magnet structure 32 positioned within a movable coil or coils 31, as illustrated in FIG. 3. The stationary multiple pole magnet structure 32 may have the same construction as the multiple armature of FIGS. 1 and/or 2, but is fixed with respect to a housing (not shown). Similarly, in the specific example of FIG. 3, the accelerating elements (not shown) can also be arranged for generating the repulsive force against the movable windings 31. The configuration of these accelerating elements may be, but are not required to be, similar to those of described in connection with armatures 12 in FIGS. 1 and 2.

Figure 4:
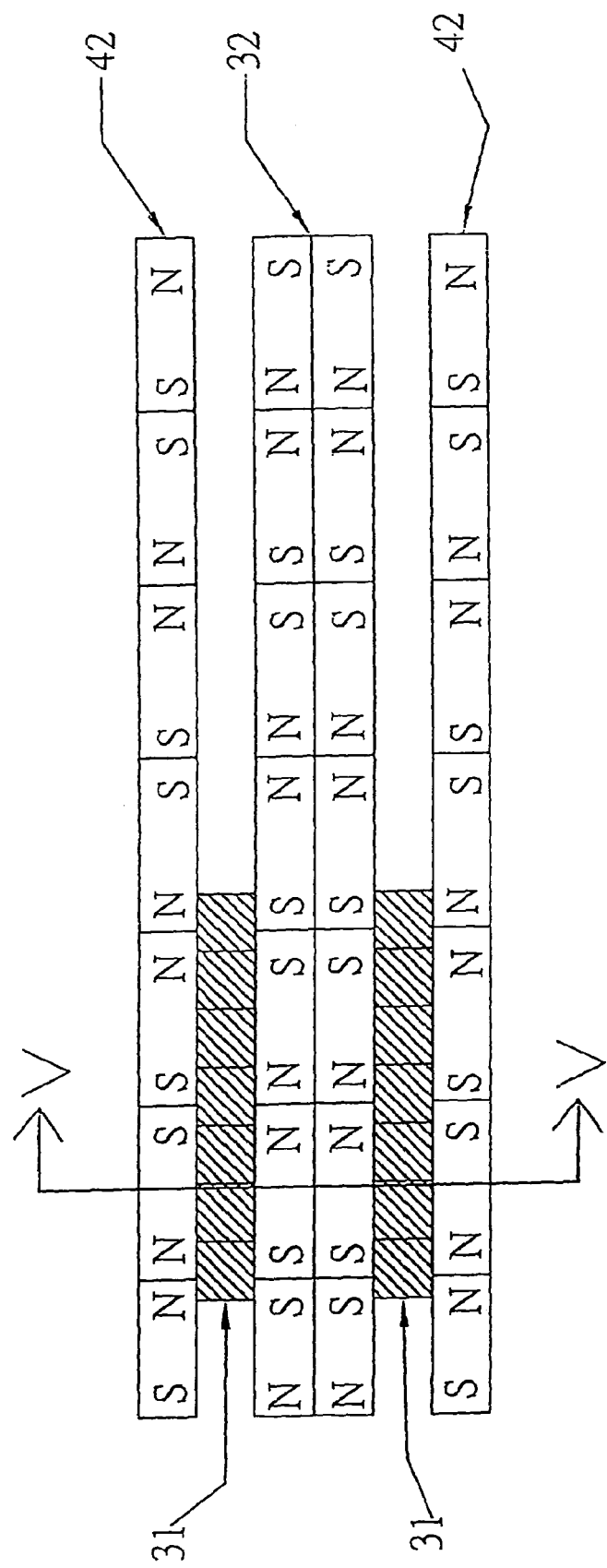
FIG. 4 is a schematic diagram of a variation of the generator of FIG. 3, including a plurality of stationary multiple pole magnetic stator structures with a series of N-S-S-N alternating arrangement.
Figure 5:
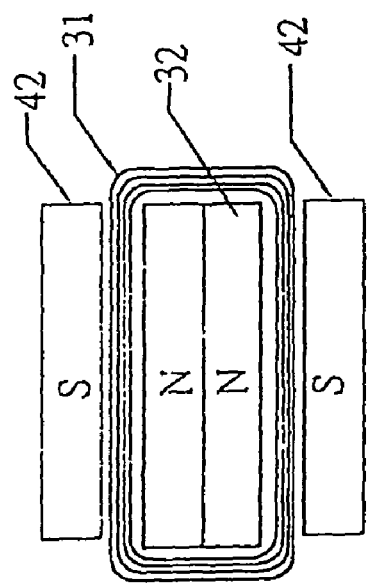
FIG. 5 is a cross-sectional view of the generator of FIG. 4, taken along line V-V.

To further increase the magnetic lines of force extending through the coils (s) 31, the generator of FIGS. 2 and 3 may be modified to include additional stationary magnet structures 42 which are not limited to one layer of magnet structure and can be positioned outside the coil(s) 31, as illustrated in FIGS. 4 and 5. Magnet structures 42 are also constructed of multiple serially connected dipole magnets, although the individual dipole magnets need not necessarily have the same construction as those of the central magnet structure.

Figure 7:
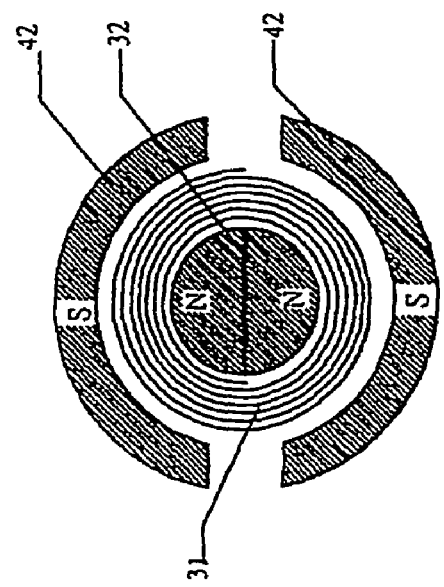
FIG. 7 is yet another alternate cross-sectional view of the generator of FIG. 4, taken along line V-V.
Figure 6:
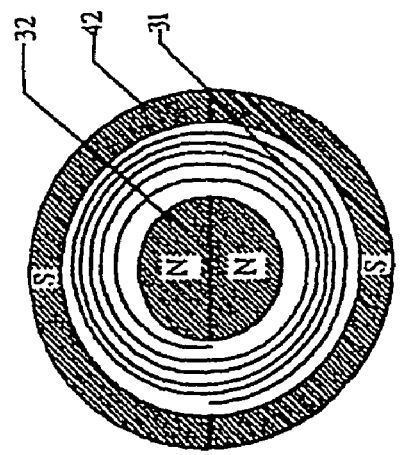
FIG. 6 is an alternate cross-sectional view of the generator of FIG. 4, also taken along line V-V.

FIG. 6 shows a variation of the generator structure illustrated in FIGS. 4 and 5, in which multiple pole magnet 32 is made up of two half cylindrical structures joined together, and in which multiple pole magnet 42 has a hollow cylindrical structure including two arc-shaped structures joined together, coil(s) 31 and magnets 32 and 42 being coaxially aligned. Alternatively, as shown in FIG. 7, the external magnet structure may consist of multiple magnets 42 having approximately semi-circular cross-sections, or be replaced by multiple magnets (not shown) having arc-shaped cross-sections that extend around a third, quarter, or smaller sections of the circumference of the generator. It will of course be appreciated by those skilled in the art that the multiple magnets 42 are not restricted to the illustrated shapes.

As illustrated in FIG. 8, the pole magnet structures 12, 32, or 42 of any of the embodiments illustrated in FIGS. 1-7 are preferably constructed of N-S alternating series-connected pairs of magnets 1,2; 3,4; and 5,6 that form pole structures 14S and 14N of FIGS. 9A and 9B. Each pair of magnets 1,2; 3,4; and 5,6 consists of at least two individual parallelepiped-shaped dipole magnets having ends 7, 8 and laterally oriented like and/or opposite magnetic poles between the ends and/or, in the case of cylindrical magnet structures, individual half-cylindrical dipole magnets (not shown) having ends corresponding to ends 7,8 and laterally oriented like and/or opposite magnetic poles between the ends. The alternating pole structures may be made by magnetizing a metal core, or in a preferred method by joining separately magnetized pole structures, although the invention is not intended to be limited to a particular method of forming or constructing the alternating poles structures.

Each magnet in a pair is joined to the other member of the pair by coating of an adhesive on at least one lateral face 9 of one of the magnets, or by welding, bonding, soldering, sintering, or any other suitable joining method, or by any combination of two or more different joining methods, such that like poles of the respective magnets face each other.

As shown in FIGS. 9A and 9B, the pairs of magnets 1,2; 3,4; and 5,6 are joined together in series by adhering, welding, bonding, soldering, sintering, or the like or by performing combinations of any two or more of the above joining methods on respective ends 7, 8 of the magnets together to form the multiple pole magnetic armature 12 or multiple pole magnetic stator structures 32. As indicated above, it has been found that the flux density of the illustrated multiple pole magnet structure is substantially higher than that of a multiple magnet structure that is not constructed of pairs of individual magnets in the illustrated manner.

The corresponding windings 11 and/or 31 of the linear electric generators of FIGS. 1 to 7 form an air core coil in which adjacent windings are wound in opposite directions in order to magnetically interact in a most efficient manner with the opposite poles of the pole magnet structures 12 and/or 32. In particular, as illustrated in FIG. 10, a first winding 11A may be wound in a clockwise direction, a second winding 11B may be wound in a counterclockwise direction when viewed along an axis of the coil, a third winding 11C may be wound in a clockwise direction, and a fourth winding 11D may be wound in a counterclockwise direction. The spacing and number of windings 11 and/or 31 can easily be adjusted depending on the spacing and number of poles of the respective pole magnet structures 12 and/or 32 to optimize distribution of magnetic lines for a simulated motion of the pole magnet structures in order to achieve an ideal magnetic line cutting efficiency and maximum energy output for the generator. However, the number of windings of the invention is not to be limited to that shown in the drawings, so long as at least one coil winding is included. Additionally, the windings may beat least one layer of a multi-layered stacked arrangement. In order to avoid the occurrence of undesired magnetic resistance, the windings 11 and/or 31 are preferably not provided with a permeable material.

Having thus described two preferred embodiments of the invention in sufficient detail to enable those skilled in the art to make and use the invention, it will nevertheless be appreciated that numerous variations and modifications of the illustrated embodiments may be made without departing from the spirit of the invention. For example, as indicated above, in constructing the armature magnet from pairs of individual dipole magnets, the individual dipole magnets and pairs of dipole magnets maybe joined together by means other than the use of adhesives, such as by welding, soldering, bonding, or sintering, or by any combination of two or more such joining methods. In addition, the number of magnetic pole structures may be any number greater than one, i.e., at least two, and the structural shapes of pole magnets are not limited to those of the above embodiments, but rather may include triangular, elliptical, or other geometric shapes. Further, the arrangement of pole magnet structures is also not limited to N-S-N-S and/or N-S-S-N polarity, but rather can extend to other combinations of N-S alternating polarities. It is therefore intended that the invention not be limited by the above description or accompanying drawings, but that it be defined solely in accordance with the appended claims.

We claim:

1. A linear electric generator, comprising:
   a stator comprising a plurality of windings aligned along an axis and at least one additional stationary magnet structure positioned outside said windings;
   at least one magnetic armature arranged to be moved relative to the windings along the axis upon application of an external force; and
   at least one direction-reversing element provided at an end of said axis to apply a force to the magnetic armature in order to reverse its direction of travel,
   a magnetic body made up of at least four magnetic pole structures, each magnetic pole structure including a north pole and a south pole, said magnetic pole structures abutting each other such that north poles of first and second said magnetic pole structures face each other to form a north pole of said armature, a south pole of said second magnetic pole structure and a south pole of a third said magnetic pole structure face each other to form a south pole of said armature, and respective additional poles at ends of said armature form additional south and north poles of said armature to provide at least two north poles (N) and two south poles (S) of N-S alternating polarities arranged in series.

2. A linear electric generator as claimed in claim 1, wherein said at least one additional stationary magnet structure includes two said stationary magnet structures.

3. A linear electric generator as claimed in claim 1, wherein said at least one additional stationary magnet structure includes multiple serially connected dipole magnets.

* * * * *